(12) United States Patent
Xu

(10) Patent No.: US 9,885,901 B2
(45) Date of Patent: Feb. 6, 2018

(54) IN-CELL TOUCH DEVICE FOR DOUBLE-GRID PANEL

(71) Applicant: SHENZHEN CHINA STAR OPTOELECTRONICS TECHNOLOGY CO., LTD., Shenzhen, Guangdong (CN)

(72) Inventor: Xiangyang Xu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 893 days.

(21) Appl. No.: 14/241,818

(22) PCT Filed: Jan. 20, 2014

(86) PCT No.: PCT/CN2014/070893
§ 371 (c)(1),
(2) Date: Jun. 3, 2014

(87) PCT Pub. No.: WO2015/100809
PCT Pub. Date: Jul. 9, 2015

(65) Prior Publication Data
US 2015/0205156 A1    Jul. 23, 2015

(30) Foreign Application Priority Data
Dec. 30, 2013    (CN) .......................... 2013 1 0745297

(51) Int. Cl.
*G02F 1/1335*    (2006.01)
*G02F 1/1333*    (2006.01)
(Continued)

(52) U.S. Cl.
CPC .......... *G02F 1/13338* (2013.01); *G06F 3/042* (2013.01); *G06F 3/045* (2013.01); *G06F 3/0412* (2013.01)

(58) Field of Classification Search
USPC ..................... 349/12; 345/173, 174
See application file for complete search history.

(56) References Cited

U.S. PATENT DOCUMENTS

2009/0295692 A1* 12/2009 Lee ..................... G02F 1/13338
345/87
2010/0157230 A1* 6/2010 Cho .................. G02F 1/136286
349/143
(Continued)

FOREIGN PATENT DOCUMENTS

CN    102231090 A    11/2011
CN    102314248 A * 1/2012
(Continued)

OTHER PUBLICATIONS

English machine translation of CN102999220A.*
(Continued)

*Primary Examiner* — Edward Glick
*Assistant Examiner* — David Chung
(74) *Attorney, Agent, or Firm* — Kim Winston LLP

(57) ABSTRACT

The present disclosure discloses a double-grid panel in-cell touch device, comprising a touch panel which includes a plurality of base units with two grid scanning lines being arranged between every two adjacent rows of base units. Each base unit includes three pixel electrodes respectively selected as red, green, and blue, with a data line arranged between every two adjacent columns of pixel electrodes, so that four data lines are provided at each column of base units with two of the four data lines respectively placed at both sides of the column thereof, wherein each pixel electrode has a pixel switch connected to one of the four data lines, and the pixel switches at each column of pixel units are distributed in such a manner that at least one of said four data lines is vacant. Each base unit is connected to a touch unit which is further connected to one of the grid scanning lines, and the (Continued)

grid scanning line connected to the touch unit serves as a touch scanning line, while one of the vacant data lines serves as a touch receiving line which is connected to the touch unit. The touch device achieves the touch function without addition of extra wires or processing difficulties based on the structure of the existing double-grid panels.

14 Claims, 3 Drawing Sheets

(51) Int. Cl.
    *G06F 3/041*     (2006.01)
    *G06F 3/042*     (2006.01)
    *G06F 3/045*     (2006.01)

(56) References Cited

U.S. PATENT DOCUMENTS

2011/0096023 A1* 4/2011 Shih ................. G06F 3/0412
                                                                     345/174

2014/0125626 A1* 5/2014 Yang ................. G02F 1/134336
                                                                     345/174

FOREIGN PATENT DOCUMENTS

| CN | 102999220 A | 3/2013 |
|---|---|---|
| CN | 202939579 U | 5/2013 |
| CN | 103728762 A | 4/2014 |

OTHER PUBLICATIONS

English machine translation of CN102231090A.*

Chinese Office Action with search report issued by the Chinese Patent Office, dated Jan. 4, 2016 in corresponding application CN 201310745297.X.

International Search Report dated Oct. 14, 2014, issued to International Application No. PCT/CN2014/070893.

* cited by examiner

IN-CELL TOUCH DEVICE FOR DOUBLE-GRID PANEL

FIELD OF THE INVENTION

The present disclosure relates to a field of display technologies, in particular to a double-grid panel in-cell touch device.

BACKGROUND OF THE INVENTION

Recently, Liquid Crystal Display (LCD) technologies have been developed rapidly, and tremendous progresses have been made in the aspects from screen dimension to display quality. LCDs, featured by small volume, low power consumption, zero radiation, and the like, have now prevailed in the field of flat panel displays. A touch liquid crystal display screen is one of the important carriers for integration of input and output terminals. In recent years, the demand on the market for touch liquid crystal display screens has increased rapidly as small and light handheld devices come out.

The touch liquid crystal display screens in the prior art are mainly classified as voltage-induction type touch liquid crystal display screens and photo-induction type touch liquid crystal display screens. These two liquid crystal display screens both employ a set of independent and touch function-implementing scan addressing lines (including a touch scanning line and a touch receiving line) to achieve positioning of a touch spot. However, a set of scan addressing lines (including a transverse scanning grid line and a longitudinal data line) for a display function already exists in the pixel structures of the liquid crystal display screens. Thus, if the scanning grid line and the data line for the display function are interlaced with the touch emission line and the touch receiving line for a touch function or photo-touch function, not only the aperture ratio of pixels will be reduced, but the processing difficulties in preparing touch liquid crystal display screens will also be increased. And relevant technological defects will be increased as well.

SUMMARY OF THE INVENTION

The technical problem to be solved by the present disclosure is to provide a double-grid panel in-cell touch device, which can achieve the touch function without addition of extra wires or processing difficulties based on the structure of the existing double-grid panels, and is capable of reducing the impact on the aperture ratio of pixels and ensuring color saturation.

The technical solution provided in the present disclosure is a double-grid panel in-cell touch device, comprising a touch panel which includes a plurality of base units distributed in the form of an array, with two grid scanning lines being arranged between every two adjacent rows of base units.

Each base unit includes three pixel electrodes respectively selected as red, green, and blue, with a data line arranged between every two adjacent columns of pixel electrodes, so that four data lines are provided at each column of base units with two of the four data lines respectively placed at both sides of the column thereof, wherein each pixel electrode has a pixel switch connected to one of the four data lines, and the pixel switches at each column of pixel units are distributed in such a manner that at least one of said four data lines is vacant.

Each base unit is connected to a touch unit which is further connected to one of the grid scanning lines, and the grid scanning line connected to the touch unit serves as a touch scanning line, while one of the vacant data lines serves as a touch receiving line which is connected to the touch unit.

Compared with the prior art, the double-grid panel in-cell touch device according to the present disclosure has the following advantages. By using the shared grid scanning line as the touch scanning line and one of the vacant data lines as the touch receiving line, the touch function can be achieved without addition of extra wires based on the structure of the existing TFT double-grid panel. The processing difficulties will not be increased since there is no addition of wires. This only has a quite small impact on the aperture ratio of the pixel electrodes provided with the touch unit, and color saturation can be easily ensured by improving the pixel luminance of the pixel electrodes where the touch unit is arranged.

The touch panel includes a color filter substrate and an array substrate. The plurality of base units are all arranged on the array substrate, and the color filter substrate is connected to a conductive trigger element for triggering touch electrodes on the array substrate.

In one embodiment, the touch unit is a photo-touch unit, and the touch receiving line is a photo-touch receiving line. The photo-touch unit is arranged in one pixel electrode of the base unit, thereby achieving the touch function by means of photo-induction or photo-touch.

In one preferred embodiment, the photo-touch unit includes:
a photosensitive semiconductor element;
a first metal element arranged on the photosensitive semiconductor element for connecting the photosensitive semiconductor element and the photo-touch receiving line;
a transparent conductive film arranged on and connected to the touch scanning line; and
a second metal element arranged below the transparent conductive film and above the photosensitive semiconductor element for connecting the transparent conductive film and the photosensitive semiconductor element.

After an optical signal is sensed by the photosensitive semiconductor element, positioning of a touch spot can be achieved through the touch scanning lines in the corresponding rows and the photo-touch receiving lines at the corresponding columns. Each photo-touch unit only corresponds to one touch scanning line coordinate and one photo-touch receiving line coordinate, thus realizing accurate positioning. The structure is relatively simple and therefore can be easily implemented.

In one embodiment, the array substrate includes:
a substrate;
a grid insulating layer arranged on the substrate;
a photosensitive semiconductor layer arranged on the grid insulating layer;
a source/drain metal layer arranged on the semiconductor layer;
a passivating layer arranged on the source/drain metal layer and forming a groove in the middle region of the source/drain metal layer; and
a transparent conductive film arranged on the passivating layer and on a surface of the groove to form the touch electrode.

The photosensitive semiconductor layer is generally formed by adding photosensitive material in A-Si. Photo-touch or photo-induction type touch can be achieved by triggering the touch electrodes on the array substrate through the conductive trigger element.

In another embodiment, the touch unit is a resistive touch unit, and the touch receiving line is a resistive touch receiving line. Through providing the resistive touch unit, resistive touch can be achieved during touch by a conductive material, such as human hands or metals.

In one preferred embodiment, the resistive touch unit includes:
a first resistance element;
a first metal element arranged on the first resistance element for connecting the first resistance element and the resistive touch receiving line;
a second resistance element separated from the first resistance element and achieving turn-on with the first resistance element during touch;
a transparent conductive film arranged on and connected to the touch scanning line; and
a second metal element arranged below the transparent conductive film for connecting the transparent conductive film and the second resistance element.

In one embodiment, the array substrate includes:
a substrate;
a grid insulating layer arranged on the substrate;
a semiconductor layer arranged on the grid insulating layer;
a source/drain metal layer arranged on the semiconductor layer;
a passivating layer arranged on the source/drain metal layer and forming a groove on the source/drain metal layer; and
a transparent conductive film, arranged on the passivating layer and on a surface of the groove to form the touch electrode.

A-Si is generally adopted for the photosensitive semiconductor layer. Resistive touch can be achieved by triggering the conductive film on the array substrate through the conductive trigger element.

In one preferred embodiment, the pixel switches at each column of base units are distributed in such a manner that two of said four data lines are vacant, with either of the two vacant data lines being provided with the touch unit at either side thereof. Either of these two vacant data lines can be used as the touch receiving line, and the touch units are arranged at one side of the touch receiving line. After the positions of the touch units are determined, the touch receiving line can be also determined correspondingly.

In one preferred embodiment, each of the base units is arranged in an order of red, green, and blue. In a row direction, a vacant data line is provided between the red pixel electrode and the green pixel electrode, and a vacant data line is provided between the blue pixel electrode and the adjacent red pixel electrode. The touch units are arranged at the same side of one of the vacant data lines. For example, the touch units at the same column of base units are all arranged at a left or right side of the blue pixel electrodes. This ensures that the position of touch only corresponds to the position of the touch spot determined by two coordinates, i.e. the touch scanning line coordinate and the touch receiving line coordinate, and therefore, an accurate positioning of the touch spot can be ensured.

DETAILED DESCRIPTION OF THE EMBODIMENTS

The present disclosure will be further illustrated below in conjunction with the accompanying drawings and specific embodiments.

Figure 1:
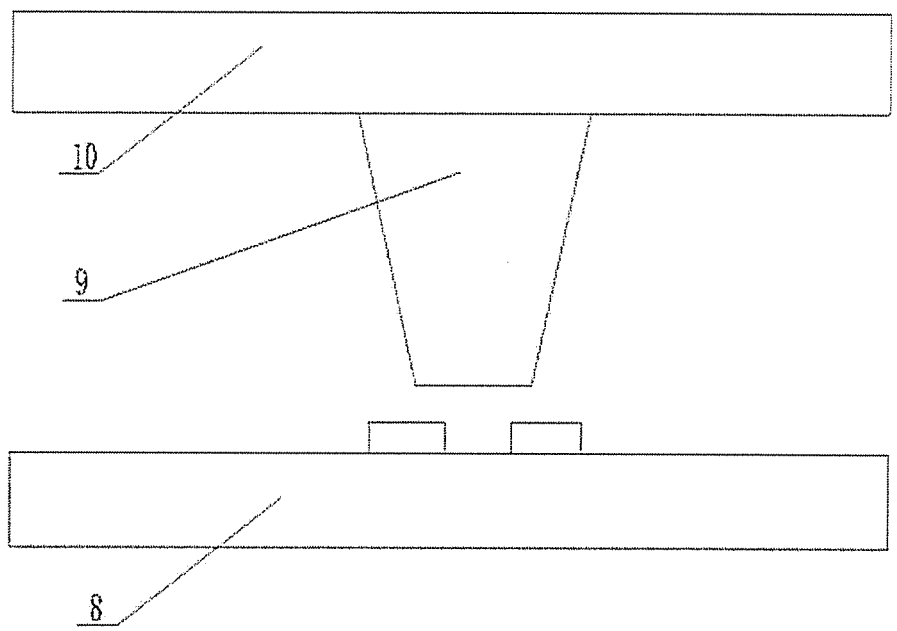
FIG. 1 schematically shows a double-grid panel in-cell touch device according to the present disclosure.

FIG. 1 schematically shows a double-grid panel in-cell touch device according to the present disclosure. In this embodiment, the touch device includes a touch panel. The touch panel comprises a color filter substrate 10 and an array substrate 8 which has a plurality of base units 7 distributed in the form of a TFT array. The color filter substrate 10 is connected to a conductive trigger element 9 therebelow for triggering the touch electrodes provided on the array substrate 8. In this embodiment, the conductive trigger element 9 is made of conductive PS (polystyrene).

Figure 2:
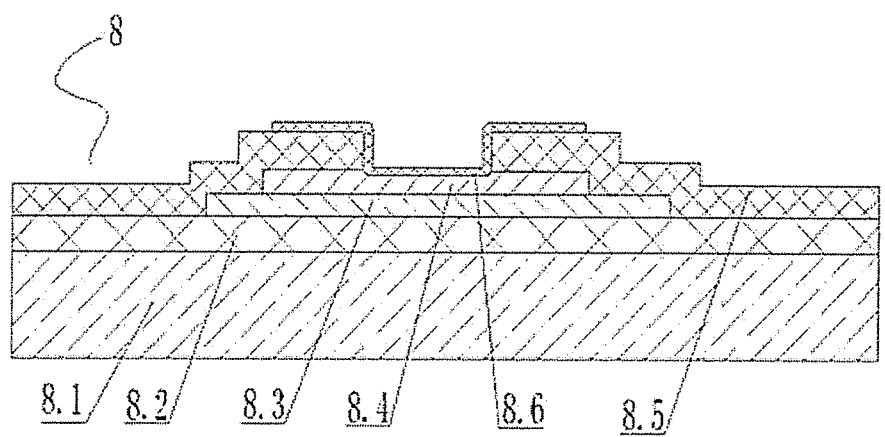
FIG. 2 shows a cross section diagram of the array substrate in FIG. 1.

FIG. 2 is a cross section diagram of the array substrate 8 in the double-grid panel in-cell touch device according to the present disclosure. In FIG. 2, the bottommost layer is a substrate 8.1. A grid insulating layer 8.2 made of silicon nitride is arranged on the substrate 8.1. A semiconductor layer 8.3 is provided in the middle region above the grid insulating layer 8.2. A source/drain (S/D) metal layer 8.4 is arranged above the semiconductor layer 8.3. A passivating layer 8.5 made of silicon nitride is provided on the source/drain (S/D) metal layer 8.4, and correspondingly, a groove is formed in the middle region of the source/drain (S/D) metal layer 8.4. A transparent conductive film 8.6 made of ITO is arranged on both the passivating layer 8.5 and an upper surface of the groove. A silicon nitride-made passivating layer, which is connected to the passivating layer 8.5, is arranged both at two sides of the semiconductor layer 8.3 and at two sides of the source/drain (S/D) metal layer 8.4 on the grid insulating layer 8.2. For a resistive touch manner, the semiconductor layer adopts an A-Si semiconductor layer. For a photo-induction type touch manner, the semiconductor layer 8.3 can be a photosensitive semiconductor layer formed by A-Si material doped with a photosensitive material.

Figure 3:
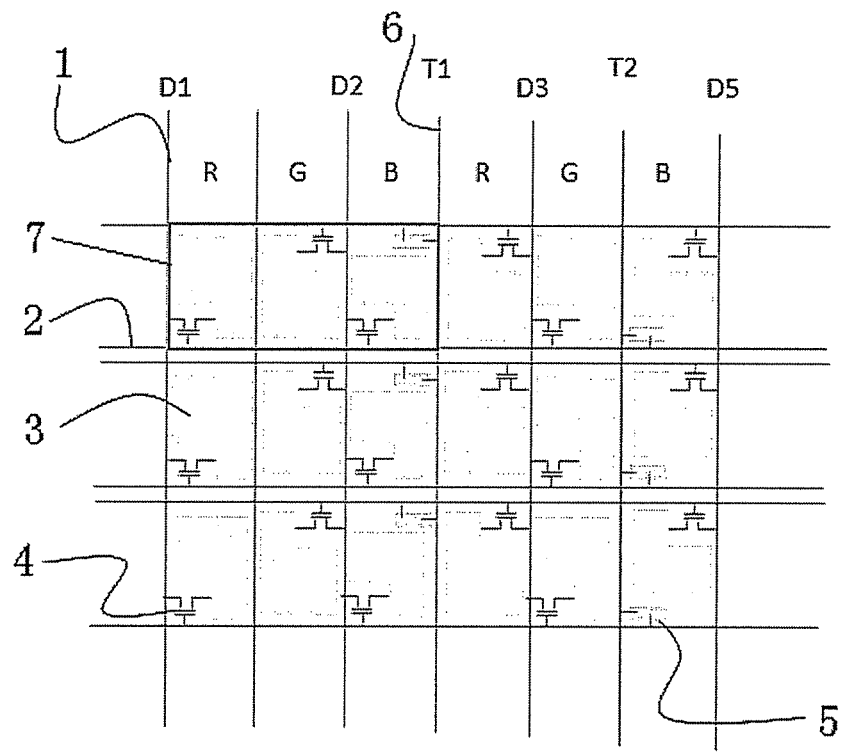
FIG. 3 shows the circuits of one specific embodiment in FIG. 1.

FIG. 3 shows the circuit structure of one embodiment of the double-grid panel in-cell touch device of photo-touch type according to the present disclosure. In this embodiment, each of the base units 7 includes three pixel electrodes 3 which are arranged in an order of red, green, and blue. Each pixel electrode 3 corresponds to a TFT pixel switch 4. Two grid scanning lines 2 are arranged between every two adjacent rows of base units, and a data line 1 is arranged between every two adjacent columns of pixel electrodes 3 in each base unit 7. In a direction from left to right in FIG. 3, the TFT pixel switches 4 at a first column of base units 7 are positioned in such a manner that they are all connected to a first data line D1 and a third data line D2, while a second data line and a fourth data line T1 are vacant, i.e. not connected to the TFT pixel switches 4. A photo-touch unit 5 is arranged on the upper right of each of the blue pixel electrodes 3 at the first column of base units 7. Each photo-touch unit 5 is connected to an upper adjacent grid scanning line 2 which is also known as a photo-touch scanning line. The photo-touch units 5 at the first column of base units 7 are all connected to the vacant data line T1 which serves as a photo-touch receiving line 6. Apart from the data line T1 at the first column of base units, a second column of the base units 7 has a vacant data line T2. The photo-touch unit 5 is arranged on the lower left of each of the blue pixel electrodes 3 at the second column of base units 7, and the photo-touch units 5 are all connected to the data line T2, and to a lower adjacent grid scanning line 2. That is to say, there is no addition of extra lines. The grid scanning lines 2 shared by the photo-touch units 5 are used as the photo-touch scanning lines, and the vacant data lines T1 and T2 are used as the photo-touch receiving lines 6.

Figure 4:
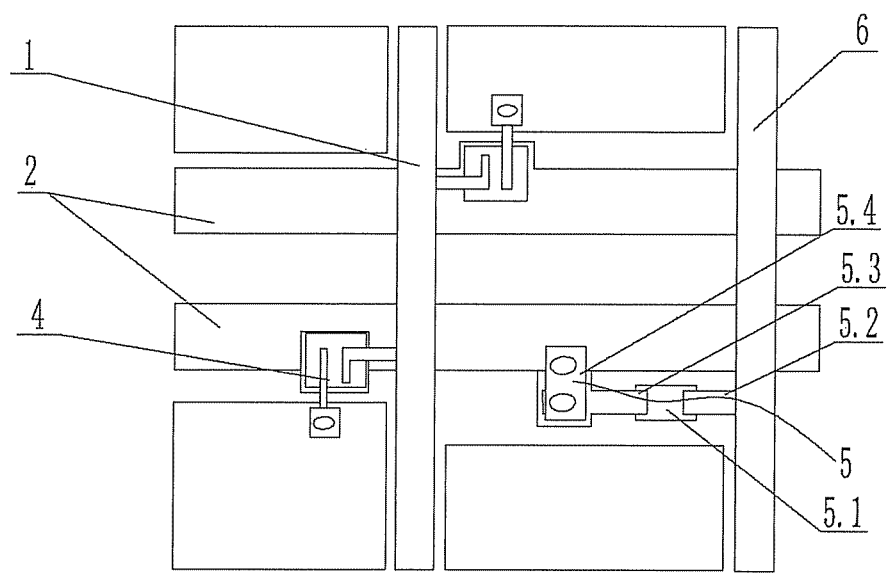
FIG. 4 is a partially schematic diagram of FIG. 3.

FIG. 4 is a structure of the photo-touch unit 5. In FIG. 4, the photo-touch unit 5 includes:

a photosensitive semiconductor element 5.1;

a first metal element 5.2 provided on the photosensitive semiconductor element 5.1 for connecting the photosensitive semiconductor element 5.1 and the photo-touch receiving line 6;

a transparent conductive film 5.4 provided on and connected to the touch scanning line 2, wherein an insulating layer is arranged between the transparent conductive film 5.4 and the touch scanning line 2, through holes being arranged on the insulating layer to achieve turn-on between the touch scanning line 2 and the transparent conductive film 5.4 during power-on, and wherein the transparent conductive film 5.4 generally adopts an ITO (Indium Tin Oxide) film; and a second metal element 5.3 arranged below the transparent conductive film 5.4 and above the photosensitive semiconductor element 5.1 for connecting the transparent conductive film 5.4 and the photosensitive semiconductor element 5.1.

Figure 5:
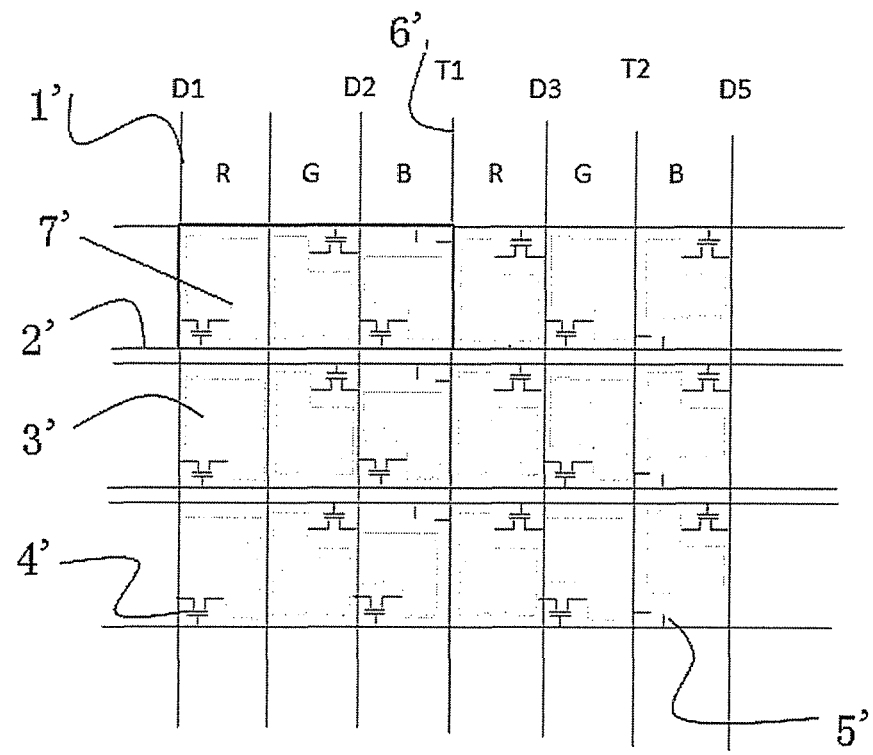
FIG. 5 shows the circuits of another specific embodiment in FIG. 1.

FIG. 5 shows the circuits of one embodiment of the double-grid panel in-cell touch device of resistive touch type according to the present disclosure. In this embodiment, each base unit 7' includes three pixel electrodes 3' which are arranged in an order of red, green and blue, with each pixel electrode 3' corresponding to a TFT pixel switch 4'. Two grid scanning lines 2' are arranged between every two adjacent rows of base units, and a data line 1' is arranged between every two adjacent columns of the pixel electrodes 3' in each base unit 7'. In a direction from left to right in FIG. 5, the TFT pixel switches 4' at a first column of base units 7' are positioned in such a manner that they are all connected to the first data line D1 and the third data line D2, while the second data line and the fourth data line T1 are vacant, i.e. not connected to the TFT pixel switches 4'. A resistive touch unit 5' is arranged on the upper right of each blue pixel electrode 3' at the first column of base units 7'. Each resistive touch unit 5' is connected to an upper adjacent grid scanning line 2' which is also known as a resistive touch scanning line. The resistive touch units 5' at the first column of base units 7' are all connected to the vacant data line T1 which is a resistive touch receiving line 6'. Apart from the data line T1 at the first column of base units 7', a second column of base units 7' has a vacant data line T2. The resistive touch unit 5' is arranged on the lower left of each of the blue pixel electrodes 3' at the second column of base units 7', and the resistive touch units 5' are all connected to the data line T2, and to a lower adjacent grid scanning line 2'. That is to say, there is no addition of extra lines. The grid scanning lines 2' shared by the resistive touch units 5' are used as the resistive touch scanning lines, and the vacant data lines T1 and T2 are used as the resistive touch receiving lines 6'.

Figure 6:
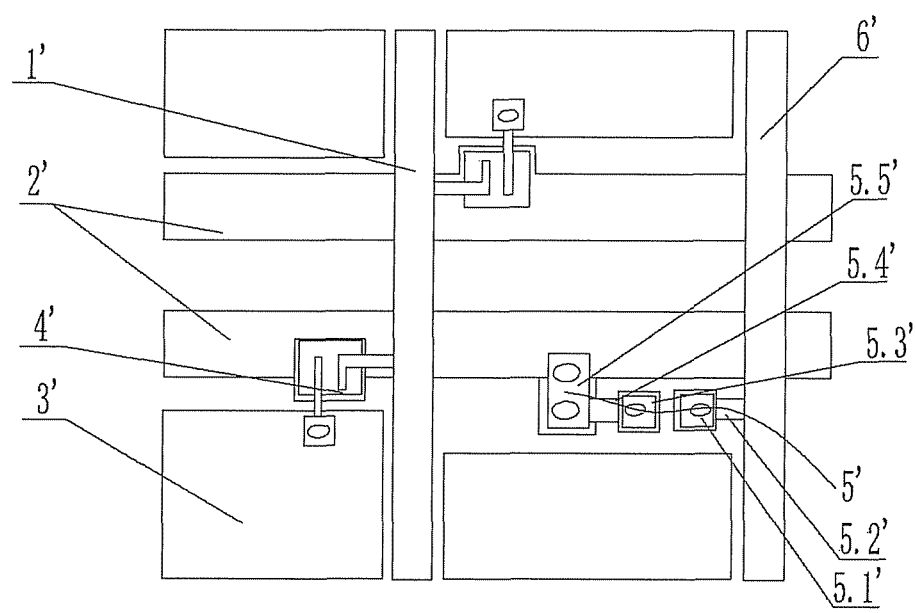
FIG. 6 is a partially schematic diagram of FIG. 5.

FIG. 6 is a structure of the resistive touch unit 5'. In FIG. 6, the resistive touch unit 5' includes:

a first resistance element 5.1';

a first metal element 5.2' provided on the first resistance element 5.1' for connecting the first resistance element 5.1' and the resistive touch receiving line 6';

a second resistance element 5.3' separated from the first resistance element 5.1' and achieving turn-on with the first resistance element 5.1' during touch;

a transparent conductive film 5.5' arranged on and connected to the touch scanning line 2'; and a second metal element 5.4' arranged below the transparent conductive film 5.5' for connecting the transparent conductive film 5.5' and the second resistance element 5.3', wherein in general, the first resistance element 5.1', the second resistance element 5.3', and the transparent conductive film 5.5' are all connected to an insulating layer with through holes therebelow for the purpose of turn-on, and wherein the transparent conductive film 5.5' generally adopts an ITO (Indium Tin Oxide) film.

Although the present disclosure has been described in conjunction with the preferred embodiments, it can be understood that various modifications or substitutes can be made to the present disclosure without departing from the scope of the present disclosure. Particularly, all features in all the embodiments may be combined together as long as structural conflicts do not exist, and the combined features to be formed are still within the scope of the present disclosure. The present disclosure is not limited to the specific embodiments disclosed herein, but encompasses all the technical solutions falling into the scope of the claims.

The invention claimed is:

1. A double-grid panel in-cell touch device, comprising a touch panel which includes a plurality of base units distributed in the form of an array, with two grid scanning lines being arranged between every two adjacent rows of base units, wherein each base unit includes a first sub-unit and a second sub-unit, both the first sub-unit and the second sub-unit being arranged in an order of red, green, and blue, with a data line arranged between every two adjacent columns of pixel electrodes, so that four data lines are provided at each column of base units with two of the four data lines respectively placed at both sides of the column thereof, wherein each pixel electrode has a pixel switch connected to one of the four data lines, and the pixel switches at each column of pixel units are distributed in such a manner that two of said four data lines are vacant data lines, and wherein, in a row direction, one vacant data line is provided between a red pixel electrode of the second sub-unit and a blue pixel electrode of the first sub-unit, and the other vacant data line is provided between a blue pixel electrode of the second sub-unit and a green pixel electrode of the second sub-unit, and wherein each of the first sub-unit and a second sub-unit is connected to a touch unit which is further connected to one of the grid scanning lines, and the grid scanning line connected to the touch unit serves as a touch scanning line, while the vacant data line serves as a touch receiving line which is connected to the touch unit;

wherein the touch unit is arranged at one side of one of the vacant data line.

2. The double-grid panel in-cell touch device according to claim 1, wherein the touch panel includes a color filter substrate and an array substrate, wherein the plurality of base units are all arranged on the array substrate, and the color filter substrate is connected to a conductive trigger element for triggering touch electrodes on the array substrate.

3. The double-grid panel in-cell touch device according to claim 1, wherein the touch unit is a photo-touch unit, and the touch receiving line is a photo-touch receiving line.

4. The double-grid panel in-cell touch device according to claim 2, wherein the touch unit is a photo-touch unit, and the touch receiving line is a photo-touch receiving line.

5. The double-grid panel in-cell touch device according to claim 3, wherein the photo-touch unit includes:
   a photosensitive semiconductor element;
   a first metal element arranged on the photosensitive semiconductor element for connecting the photosensitive semiconductor element and the photo-touch receiving line;
   a transparent conductive film arranged on and connected to the touch scanning line; and
   a second metal element arranged below the transparent conductive film and above the photosensitive semiconductor element for connecting the transparent conductive film and the photosensitive semiconductor element.

6. The double-grid panel in-cell touch device according to claim 4, wherein the photo-touch unit includes:
   a photosensitive semiconductor element;
   a first metal element arranged on the photosensitive semiconductor element for connecting the photosensitive semiconductor element and the photo-touch receiving line;
   a transparent conductive film arranged on and connected to the touch scanning line; and
   a second metal element arranged below the transparent conductive film and above the photosensitive semiconductor element for connecting the transparent conductive film and the photosensitive semiconductor element.

7. The double-grid panel in-cell touch device according to claim 3, wherein the array substrate includes:
   a substrate;
   a grid insulating layer arranged on the substrate;
   a photosensitive semiconductor layer arranged on the grid insulating layer;
   a source/drain metal layer arranged on the semiconductor layer;
   a passivating layer arranged on the source/drain metal layer and forming a groove in the middle region of the source/drain metal layer; and
   a transparent conductive film arranged on the passivating layer and on a surface of the groove to form the touch electrode.

8. The double-grid panel in-cell touch device according to claim 4, wherein the array substrate includes:
   a substrate;
   a grid insulating layer arranged on the substrate;
   a photosensitive semiconductor layer arranged on the grid insulating layer;
   a source/drain metal layer arranged on the semiconductor layer;
   a passivating layer arranged on the source/drain metal layer and forming a groove in the middle region of the source/drain metal layer; and
   a transparent conductive film arranged on the passivating layer and on a surface of the groove to form the touch electrode.

9. The double-grid panel in-cell touch device according to claim 1, wherein the touch unit is a resistive touch unit, and the touch receiving line is a resistive touch receiving line.

10. The double-grid panel in-cell touch device according to claim 2, wherein the touch unit is a resistive touch unit, and the touch receiving line is a resistive touch receiving line.

11. The double-grid panel in-cell touch device according to claim 9, wherein the resistive touch unit includes:
    a first resistance element;
    a first metal element arranged on the first resistance element for connecting the first resistance element and the resistive touch receiving line;
    a second resistance element separated from the first resistance element and achieving turn-on with the first resistance element during touch;
    a transparent conductive film arranged on and connected to the touch scanning line; and
    a second metal element arranged below the transparent conductive film for connecting the transparent conductive film and the second resistance element.

12. The double-grid panel in-cell touch device according to claim 10, wherein the resistive touch unit includes:
    a first resistance element;
    a first metal element arranged on the first resistance element for connecting the first resistance element and the resistive touch receiving line;
    a second resistance element separated from the first resistance element and achieving turn-on with the first resistance element during touch;
    a transparent conductive film arranged on and connected to the touch scanning line; and
    a second metal element arranged below the transparent conductive film for connecting the transparent conductive film and the second resistance element.

13. The double-grid panel in-cell touch device according to claim 9, wherein the array substrate includes:
    a substrate;
    a grid insulating layer arranged on the substrate;
    a semiconductor layer arranged on the grid insulating layer;
    a source/drain metal layer arranged on the semiconductor layer;
    a passivating layer arranged on the source/drain metal layer and forming a groove on the source/drain metal layer; and
    a transparent conductive film, arranged on the passivating layer and on a surface of the groove to form the touch electrode.

14. The double-grid panel in-cell touch device according to claim 10, wherein the array substrate includes:
    a substrate;
    a grid insulating layer arranged on the substrate;
    a semiconductor layer arranged on the grid insulating layer;
    a source/drain metal layer arranged on the semiconductor layer;
    a passivating layer arranged on the source/drain metal layer and forming a groove on the source/drain metal layer; and
    a transparent conductive film, arranged on the passivating layer and on a surface of the groove to form the touch electrode.

* * * * *